United States Patent Office 2,696,485
Patented Dec. 7, 1954

---

2,696,485

CUPRIFEROUS AZO-AZOXY DYESTUFFS OF THE STILBENE SERIES

Henri Riat, Arlesheim, Switzerland, assignor to Ciba Limited, Basel, Switzerland, a Swiss firm No Drawing. Application April 21, 1952,
Serial No. 283,489

Claims priority, application Switzerland April 28, 1951

9 Claims. (Cl. 260—143)

The present invention provides new cupriferous azo-dyestuffs of the stilbene series, for example, the complex copper compound of the formula (1)

(in which Z represents an azo or azoxy linkage), and which cupriferous azo dyestuffs correspond to the general formula (2)

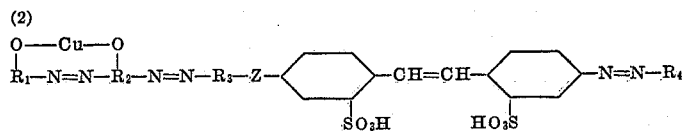

in which the group —O—Cu—O— is bound to the radicals $R_1$ and $R_2$ in positions vicinal to the azo-linkage, $R_1$, $R_2$ and $R_3$ each represent a benzene radical, Z represents an azo or azoxy linkage, and $R_4$ represents the radical of a hydroxybenzene ortho-carboxylic acid bound to the azo linkage in para-position with respect to the hydroxy group or the radical of an alkoxy-benzene free from carboxylic acid groups, the two azo-linkages bound to the benzene radical $R_2$ and the azo linkage and group Z bound to the benzene radical $R_3$ being present in para-position relatively to one another.

The cupriferous dyestuffs of the above constitution can be made by treating a dyestuff of the general formula (3)

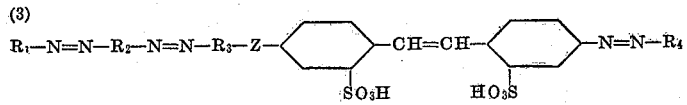

in which $R_1$, $R_2$ and $R_3$ each represent a benzene radical, Z represents an azo- or azoxy-linkage, and $R_4$ represents the radical of a hydroxybenzene ortho-carboxylic acid bound to the azo-linkage in para-position with respect to the hydroxy group or the radical of an alkoxy-benzene free from carboxylic acid groups, and in which one of the radicals $R_1$ and $R_2$ contains a hydroxyl group and the other a methoxy or hydroxyl group in a position vicinal to the azo-linkage connecting $R_1$ with $R_2$, and the two azo linkages bound to the benzene radical $R_2$ and the azo-linkage and the linkage Z bound to the benzene radical $R_3$ being in para-position relatively to one another, with an agent yielding copper under conditions such that the corresponding ortho:ortho'-dihydroxy-azo-copper complex is formed.

Accordingly, the radical $$R_1—N=N—R_2—N=N—R_3—Z$$

has the structure

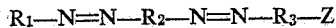

Dyestuffs, which can be used as starting materials for the present process and correspond to the above general Formula 3, can be made by condensing a compound of the formula (4)

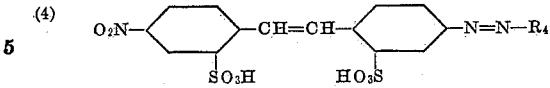

(in which $R_4$ has the meaning given above) with an amino-disazo-dyestuff of the general formula (5)         $R_1—N=N—R_2—N=N—R_3—NH_2$ (in which $R_1$, $R_2$ and $R_3$ have the meanings given above).

These amino-disazo-dyestuffs can be made by methods in themselves known, for example, by coupling the diazo-compound of an amine of the formula $R_1—NH_2$ with a middle component of the formula $H—R_2—NH_2$, and further diazotizing the resulting amino-mono-azo-dyestuff, and coupling it with a middle component of the formula $H—R_3—NH_2$.

The starting materials are so chosen that in the resulting amino-disazo-dyestuff one of the radicals $R_1$ and $R_2$ contains a hydroxyl group and the other a methoxy group or a hydroxyl group in positions vicinal to the azo-linkage connecting $R_1$ with $R_2$. Thus, for example, an ortho-hydroxydiazo compound may be coupled with a 1-amino-3-methoxybenzene or 1-amino-3-hydroxybenzene, which may contain further substituents. In this connection it is of advantage to use diazo compounds containing sulfonic acid groups.

For producing the amino disazo-dyestuffs there may be used, for example, the following starting materials:

As amines of the formula $R_1—NH_2$ (initial components): 2-amino-1-hydroxybenzene sulfonic acid, 4-chloro-2-amino-1-hydroxybenzene-6-sulfonic acid, 2-amino-1-hydroxybenzene-4-sulfonic acid amide, 2-amino-1-hydroxybenzene-4-sulfonic acid-6-carboxylic acid, 2-amino-1-hydroxybenzene-4:6-disulfonic acid, and also ortho-methoxy-amino-compounds of the benzene series (for coupling with such middle components of the formula $H—R_2—NH_2$ as contain a hydroxyl group in a position vicinal to the coupling position) such as 2-amino-1-methoxybenzene-4-sulfonic acid and 2-amino-1-methoxy-benzene-4-sulfonic acid amide.

As middle components of the formula $R_2—NH_2$: Amines which contain a hydroxyl group and are capable of coupling in a position vicinal to that group, for example, 1-amino-3-hydroxybenzene and 1-amino-3-hydroxy-6-methylbenzene; amines of the benzene series which contain a methoxy group in meta-position with respect to the amino group (for coupling with the ortho-hydroxy-diazo-compounds), such as 1-amino-2:5-dimethoxybenzene and 1-amino-3-methoxy-5-methyl benzene; especially valuable for this purpose are 1-amino-3-methoxybenzene and 1-amino-2-methyl-5-methoxybenzene.

As middle components of the formula $R_3—NH_2$: Aminobenzene, 1-amino-2-methoxy-5-methylbenzene, and especially amino-monomethyl- or -dimethyl-benzenes such as 1-amino-3-methylbenzene and 1-amino-2:5-dimethylbenzene.

The reactions necessary for producing the amino-disazo-dyestuffs, that is to say the diazotizations and couplings may be carried out by the usual methods such as have been found advantageous for producing similar products. Coupling with amines capable of coupling in para-position with respect to the amino-group is generally carried out with advantage in an acid medium. A number of such azo-components is advantageously coupled in the form of the ω-methane sulfonic acid and the ω-methane sulfonic acid radical is split off after coupling.

Especially valuable amino-disazo-dyestuffs are those of the general formulae

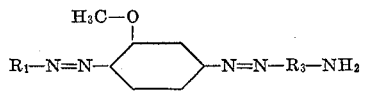

and

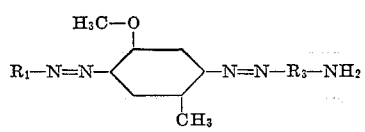

in which $R_1$ and $R_3$ have the meanings given above.

The compounds of the above Formula 4 which, when condensed with the amino-disazo-dyestuffs of the Formula 5, yield the starting materials of the present process are made either from diazotized 4-nitro-4'-aminostilbene-2:2'-disulfonic acid and hydroxybenzene-ortho-carboxylic acids capable of coupling, for example, 6-chloro- or 5- or 6-methyl-1-hydroxybenzene-2-carboxylic acid or especially 1-hydroxybenzene-2-carboxylic acid itself, or from diazotized 4-nitro-4'-aminostilbene-2:2'-disulfonic acid and hydroxybenzenes capable of coupling which are free from carboxylic acid groups, especially compounds of this kind capable of coupling in para-position with respect to the hydroxyl group, such as hydroxybenzene itself, or 2-methyl-1-hydroxybenzene, and subsequent alkylation of the hydroxyl group, for example, with an ethylating or methylating agent such as ethyl bromide or chloride, methyl bromide or chloride, diethyl sulfate or dimethyl sulfate.

The condensation of the nitro compounds of the above general Formula 4 with amino-disazo-dyestuffs of the above general Formula 5 is advantageously carried out in an aqueous medium and in the presence of an alkali metal hydroxide. Good results are obtained, for example, by reacting the components together in a dilute solution of an alkali metal hydroxide, for example, a solution of 2–8 per cent. strength, for a prolonged period, for example, 5–24 hours at a raised temperature, for example, in an open vessel at the boiling temperature of the reaction mixture and under reflux or at a higher temperature and under pressure.

Since at the present time it is supposed that the condensation of primary amines with nitro-stilbene compounds by the methods referred to above leads to the formation of azoxy or azo-linkages, the dyestuffs used as starting materials in the present process may contain either an azoxy or azo-linkage at the position Z indicated in the above formulae. The existence of a mixture of the two compounds of this kind is also possible. Accordingly, the linkage formed by reacting the nitro group in the 4-position relatively to the —CH=CH— linkage of the stilbene compound with the amino group of the amino disazo-dyestuff is designated for simplicity as the azo or azoxy linkage.

As agents yielding copper there may be used in the present process for example salts of monovalent or divalent copper such as cuprous chloride or cupric sulfate, and also compounds which contain copper in complex union. Especially suitable are copper amine complexes, for example, the complex copper compounds obtainable with ammonia, alkylamines such as ethylamine, morpholine, pyridine or piperidine. In order that the methyl group shall be split off completely from the methoxy group with the formation of the copper complex in the stilbene azo-dyestuffs used as starting materials, it is usually necessary to carry out the treatment with the agent yielding copper at a raised temperature, for example, at about 90° C. for several hours. It is of advantage to work in an aqueous medium. If desired, the treatment with an agent yielding copper may be conducted in the presence of suitable additions. As such additions there may be mentioned bases, such as ammonia or organic bases, and advantageously an excess of the base which is already present in the molecule of the copper ammine complex used.

In general very good results are obtained by carrying out the treatment with the agent yielding copper in accordance with the process of U. S. Patent 2,536,957, for example, in the presence of an ethanolamine.

Among the cupriferous products, which are obtained from the dyestuffs of the Formula 3, which contain as the radical $R_4$ the radical of a hydroxybenzene ortho-carboxylic acid, there are in general especially valuable those which contain copper only in the radical of the amino-disazo-dyestuff and contain an ortho-hydroxycarboxylic acid radical free from copper. Such products containing per molecule of dyestuff only one atom of copper in complex union can be made, for example, by coppering in an acid medium. Alternatively, however, the coppering may be carried out in the manner hereinbefore referred to with a quantity of a copper ammine not greatly in excess of the quantity requisite to introduce a single atom of copper, and the resulting product may then be subjected to a mild treatment in an acid medium, which has no influence on the copper bound to the ortho:ortho'-dihydroxy-azo-group of the amino-disazo-dyestuff radical, but splits off copper from the partially formed ortho-hydroxy-carboxylic acid copper complex.

The formula

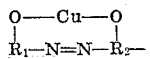

used above in defining the constitution of the cupriferous dyestuffs undoubtedly represents the correct stoichiometric quantity of copper and the correct position of the copper atom in the complex, but the distribution of the main or sub-valences in the complex linking of the copper has not been established with certainty.

The cupriferous disazo-dyestuffs of the invention are suitable for dyeing or printing a very wide variety of materials, for example, those of animal origin such as wool or leather. Owing to their good affinity for vegetable fibers they are especially suitable for dyeing or printing materials of cellulose such as linen, cotton and artificial silk or staple fibers of regenerated cellulose. When the dyestuffs still contain uncoppered metallizable groups, for example, ortho-hydroxy-carboxylic acid groups, they may be subsequently metallized on the fiber.

The dyeings obtainable with the new cupriferous dyestuffs on cellulose fibers are distinguished above all by their good fastness to washing and excellent fastness to light.

The following examples illustrate the invention, the parts and percentages being by weight:

*Example 1*

55 parts of the sodium salt of the monoazo-dyestuff, obtainable by coupling a diazotized 4-nitro-4'-aminostilbene-2:2'-disulfonic acid with hydroxybenzene in a medium rendered alkaline with sodium carbonate and methylating the hydroxyl group by means of methyl chloride, are boiled under reflux for 15 hours with 47 parts of the amino-disazo-dyestuff of the formula

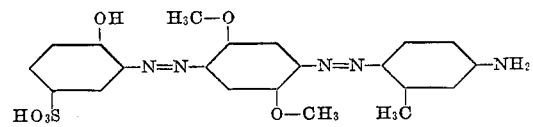

(obtainable by coupling diazotized 2-amino-1-hydroxybenzene-4-sulfonic acid with 1-amino-2:5-dimethoxybenzene, further diazotizing the resulting amino-monoazo dyestuff and coupling the latter with 1-amino-3-methylbenzene) and 750 parts of sodium hydroxide solution of 6 per cent. strength. After cooling, the solution is filtered (in order to remove any sparingly soluble by-products that may be present), the excess of sodium hydroxide is neutralized with hydrochloric acid and the dyestuff is salted out and separated by filtration.

In order to convert the dyestuff into the complex copper compound the paste so obtained is dissolved in 1500 parts of water with the addition of 40 parts of monoethanolamine, then mixed with an ammoniacal copper sulfate solution prepared from 25 parts of crystallized copper sulfate, and the whole is maintained for 6 hours at 95° C. The resulting complex copper compound is salted out, separated by filtration and dried. It dissolves in water with an olive coloration and dyes cotton olive tints having a very good fastness to light.

Instead of the amino-disazo-dyestuff of the above formula there may be used the corresponding amino-disazo-dyestuff obtainable from diazotized 4-chloro-2-amino-1-hydroxybenzene-6-sulfonic acid.

Furthermore, there may be used as starting material, instead of the methylated, the ethylated amino-monoazo-dyestuff obtainable from diazotized 4-nitro-4'-aminostilbene-2:2'-disulfonic acid and hydroxybenzene.

*Example 2*

55 parts of the sodium salt of the monoazo-dyestuff obtainable by coupling diazotized 4-nitro-4'-aminostilbene-2:2'-disulfonic acid with hydroxybenzene in a medium rendered alkaline with sodium carbonate and methylating the hydroxyl group by means of methyl chloride, are boiled for 15 hours under reflux with 44 parts of the amino-disazo-dyestuff of the formula

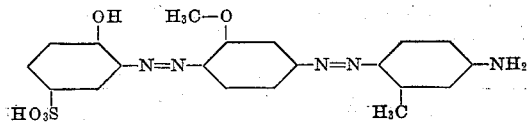

(obtainable by coupling diazotized 2-amino-1-hydroxybenzene-4-sulfonic acid with 1-amino-3-methoxybenzene, further diazotizing the resulting amino-monoazo-dyestuff and coupling with 1-amino-3-methylbenzene) with 750 parts of sodium hydroxide solution of 6 per cent. strength. After cooling the solution is filtered (in order to remove any sparingly soluble byproducts that may be present), the excess of sodium hydroxide is neutralized with hydrochloric acid, and the dyestuff is salted out and separated by filtration.

The resulting dyestuff paste is dissolved in 1500 parts of water, then mixed with 20 parts of monoethanolamine and a solution prepared from 25 parts of crystallized copper sulfate, 50 parts of aqueous ammonia solution of 25 per cent. strength and 100 parts of water, and the whole is maintained at 95° C. for 8 hours. The resulting copper compound is then salted out, separated by filtration and dried. It dissolves in water with a brown coloration and dyes cotton brown tints of good fastness to light. Instead of the amino-disazo-dyestuff of the above formula there may be used as starting material the dyestuff of the formula

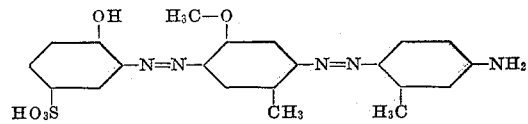

or

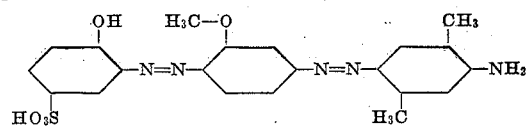

In this way there are obtained dyestuffs having similar properties.

*Example 3*

57.1 parts of the monoazo-dyestuff obtained by coupling diazotized 4-nitro-4'-aminostilbene-disulfonic acid with 1-hydroxybenzene-2-carboxylic acid in an alkaline medium are heated for 15 hours at the boil with 47 parts of the amino-disazo-dyestuff of the formula

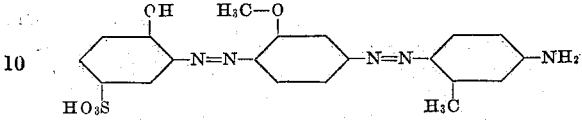

and 1000 parts of sodium hydroxide solution of 6 per cent. strength. After cooling, a sparingly soluble by-product is separated by filtration, the filtrate is neutralized with hydrochloric acid, and the dyestuff is salted out by the addition of sodium chloride and separated by filtration.

The resulting paste is dissolved in 2000 parts of water with the addition of 40 parts of monoethanolamine, and the whole mixed with an ammoniacal copper sulfate solution prepared from 25 parts of crystallized copper sulfate and heated for 8 hours at 90–95° C. The dyestuff is then salted out and separated by filtration. In order to eliminate any copper bound in complex union with the ortho-hydroxy-carboxylic acid radical, the dyestuff is introduced into 500 parts of a sodium chloride solution of 5 per cent. and hydrochloric acid is added to render the mixture weakly acid to Congo. The whole is stirred for 15 minutes at 60–70° C., filtered and the filter residue is dried and advantageously mixed with some sodium carbonate before being pulverized. There is obtained a dark powder, which dissolves in water with a brown coloration and dyes cotton brown tints of good fastness to light.

Instead of the monoazo-dyestuff from 1-hydroxybenzene-2-carboxylic acid, the monoazo-dyestuff from 6-methyl-1-hydroxybenzene-2-carboxylic acid may be condensed with the amino-disazo-dyestuff of the above formula in the same manner, and the condensation product converted into the complex copper compound.

*Example 4*

A dyebath is prepared, which contains in 3000 parts of water 1 part of the dyestuff obtained as described in the first and second paragraphs of Example 1 and 30 parts of crystallized sodium sulfate. 100 parts of cotton are entered into the dyebath at 50° C., the temperature is raised to 95° C., and dyeig is carried on for 1 hour at that temperature. The cotton is then rinsed and dried. It is dyed an olive tint, and the dyeing is distinguished by its good fastness to light.

What is claimed is:

1. A cupriferous azo-azoxy dyestuff of the stilbene series, which corresponds to the formula

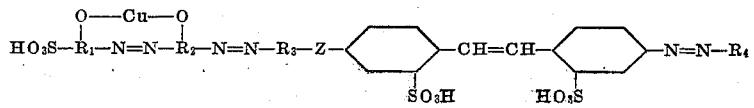

in which the groups —O—Cu—O— is bound to the radicals $R_1$ and $R_2$ in positions vicinal to the azo linkage, $R_1$, $R_2$ and $R_3$ each represent a benzene radical, Z represents a member selected from the group consisting of azo and azoxy groups, and $R_4$ represents a member selected from the group consisting of the radical of a hydroxybenzene-ortho-carboxylic acid bound to the azo linkage in para-position to the hydroxy group and the radical of an alkoxybenzene, the two azo linkages bound to the benzene radical $R_2$ and the azo linkage and the linkage Z bound to the benzene radical $R_3$ being in para-position relatively to one another.

2. A cupriferous azo-azoxy dyestuff of the stilbene series, which corresponds to the formula

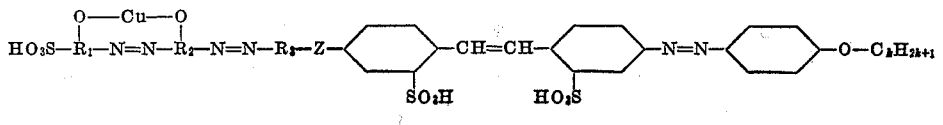

in which the group —O—Cu—O— is bound to the radicals $R_1$ and $R_2$ in positions vicinal to the azo linkage,

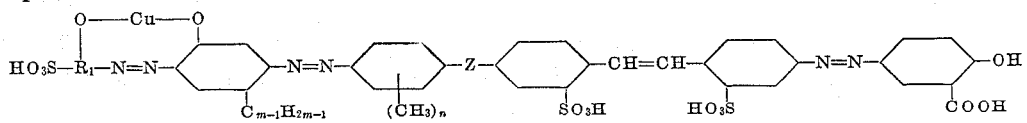

$R_1$, $R_2$ and $R_3$ each represent a benzene radical, Z represents a member selected from the group consisting of azo and azoxy groups and $k$ represents a whole number of at most 2, the two azo linkages bound to the benzene radical $R_2$ and the azo linkage and the linkage Z bound to the benzene radical $R_3$ being in para-position relatively to one another.

3. A cupriferous azo-azoxy dyestuff of the stilbene series, which corresponds to the formula

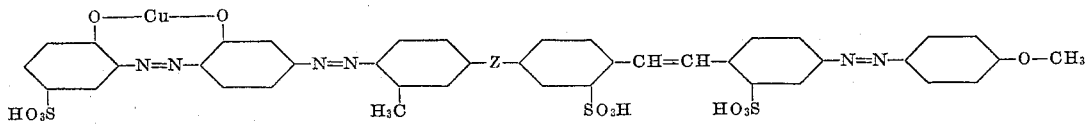

in which the group —O—Cu—O— is bound to the radicals $R_1$ and $R_2$ in positions vicinal to the azo linkage, $R_1$,

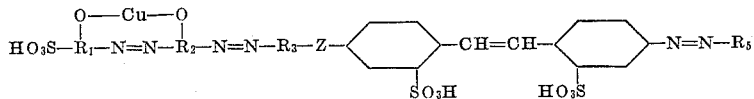

$R_2$ and $R_3$ each represent a benzene radical, Z represents a member selected from the group consisting of azo and azoxy groups and $R_5$ represents the radical of a hydroxybenzene-ortho-carboxylic acid bound to the azo linkage

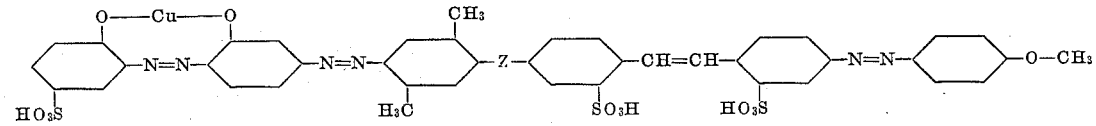

in para-position to the hydroxy group, the two azo linkages bound to the benzene radical $R_2$ and the azo linkage and the linkage Z bound to the benzene radical $R_3$ being in para-position relatively to one another.

4. A cupriferous azo-azoxy dyestuff of the stilbene series, which corresponds to the formula

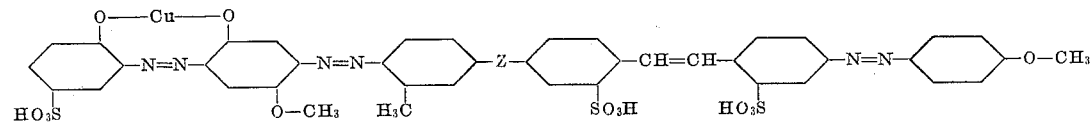

in which the group —O—Cu—O— is bound to the radical $R_1$ in ortho-position to the azo linkage, $R_1$ represents a benzene radical, Z represents a member selected from the group consisting of azo and azoxy groups, and $k$, $m$ and $n$ each represent a whole number of at most 2.

5. A cupriferous azo-azoxy dyestuff of the stilbene series, which corresponds to the formula

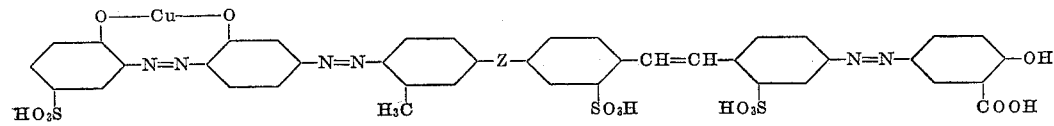

in which the group —O—Cu—O— is bound to the radical $R_1$ in ortho position to the azo linkage, $R_1$ represents a benzene radical, Z represents a member selected from the group consisting of azo and azoxy groups, and $m$ and $n$ each represent a whole number of at most 2.

6. A cupriferous azo-azoxy dyestuff of the stilbene series which corresponds to the formula

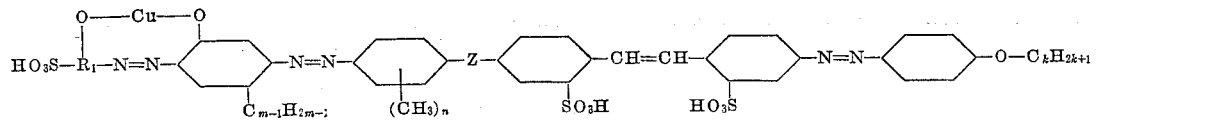

in which Z represents a member selected from the group consisting of azo and azoxy groups.

7. A cupriferous azo-azoxy dyestuff of the stilbene series which corresponds to the formula in which Z represents a member selected from the group consisting of azo and azoxy groups.

8. A cupriferous azo-azoxy dyestuff of the stilbene series which corresponds to the formula in which Z represents a member selected from the group consisting of azo and azoxy groups.

9. A cupriferous azo-azoxy dyestuff of the stilbene series which corresponds to the formula in which Z represents a member selected from the group consisting of azo and azoxy groups.

References Cited in the file of this patent

UNITED STATES PATENTS

| Number | Name | Date |
|---|---|---|
| 2,056,539 | Schindhelm et al. | Oct. 6, 1936 |
| 2,333,427 | Keller | Nov. 2, 1943 |
| 2,466,245 | Keller | Apr. 5, 1949 |